(12) United States Patent
Geng et al.

(10) Patent No.: US 12,640,144 B2
(45) Date of Patent: May 26, 2026

(54) GENERATING SYNTHETIC CONFERENCE TRANSCRIPTS USING NATURAL LANGUAGE PROCESSING

(71) Applicant: Zoom Video Communications, Inc., San Jose, CA (US)

(72) Inventors: Yuanling Geng, Hangzhou (CN); Liwei Wu, Hangzhou (CN); Bing Zhao, San Jose, CA (US); Sanqiang Zhao, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 148 days.

(21) Appl. No.: 18/422,681

(22) Filed: Jan. 25, 2024

(65) Prior Publication Data

US 2025/0246186 A1 Jul. 31, 2025

(51) Int. Cl.
*G10L 15/183* (2013.01)
*G10L 15/06* (2013.01)
*G10L 15/18* (2013.01)

(52) U.S. Cl.
CPC .......... *G10L 15/183* (2013.01); *G10L 15/063* (2013.01); *G10L 15/1815* (2013.01)

(58) Field of Classification Search
CPC . G10L 15/183; G10L 15/063; G10L 15/1815; G10L 15/26; G06N 3/08; H04L 12/1831; H04N 7/155; G06F 40/216; G06F 40/284; G06F 40/35
See application file for complete search history.

(56) References Cited

U.S. PATENT DOCUMENTS

| | | | | |
|---|---|---|---|---|
| 11,451,496 | B1 * | 9/2022 | Zhang | H04L 51/02 |
| 2021/0056860 | A1 * | 2/2021 | Fahrendorff | G06Q 10/10 |
| 2022/0353100 | A1 * | 11/2022 | Huang | G11B 27/031 |
| 2023/0343331 | A1 * | 10/2023 | Manuvinakurike | G10L 15/063 |
| 2024/0007318 | A1 * | 1/2024 | Springer | H04L 12/1822 |
| 2024/0118960 | A1 * | 4/2024 | Arunachalam | G06F 40/35 |
| 2024/0203398 | A1 * | 6/2024 | Kang | G10L 15/26 |
| 2024/0428013 | A1 * | 12/2024 | Wen | G06F 40/56 |
| 2025/0124295 | A1 * | 4/2025 | Mukherjee | G06F 40/289 |
| 2025/0165678 | A1 * | 5/2025 | Low | G06F 30/27 |

OTHER PUBLICATIONS

International Search Report and Written Opinion mailed on Apr. 1, 2025 in corresponding PCT Application No. PCT/US2025/011802.

(Continued)

*Primary Examiner* — Michael Colucci
(74) *Attorney, Agent, or Firm* — Young Basile Hanlon & MacFarlane, P.C.

(57) ABSTRACT

Synthetic conference transcripts are generated and used to train a natural processing engine to derive intelligence from conference recordings or conference transcripts. A server generates, using a natural language processing engine, synthetic conference transcripts. The server compares the synthetic conference transcripts with conference data to identify artifacts in the synthetic conference transcripts. The server provides additional training to the natural language processing engine using online learning based on the identified artifacts. The server outputs a portion of the synthetic conference transcripts selected based on the identified artifacts.

21 Claims, 9 Drawing Sheets

(56) References Cited

OTHER PUBLICATIONS

Kweon Sunjun et al: "Publicly Shareable Clinical Large Language Model Built on Synthetic Clinical Notes", Sep. 1, 2023, Retrieved from the Internet: https://arxiv.org/pdf/2309.00237v1.

Carletta Jean et al: "The AMI Meeting Corpus: A Pre-announcement", Jul. 11, 2025.

mostly.ai, Generate synthetic text data, https://mostly.ai/blog/synthetic-text-data, Richard Pelgrim, retrieved from internet Dec. 15, 2023, 26 pages.

Medium, Dialog Management, https://medium.com/tp-on-cai/dialog-management-36ace099b6a5, Thomas Packer, PH.D., Nov. 5, 2019, 17 pages.

* cited by examiner

600

700

702 — SELECT SYNTHETIC CONFERENCE FORMAT

704 — SELECT SYNTHETIC CONFERENCE TOPIC

706 — GENERATE SYNTHETIC CONFERENCE AGENDA BASED ON FORMAT AND TOPIC

708 — GENERATE SYNTHETIC CONFERENCE TRANSCRIPT BASED ON AGENDA

800

802

RECEIVE FIRST CONFERENCE TRANSCRIPT

804

IDENTIFY TOPIC AND DIALOG TURNS IN FIRST CONFERENCE
TRANSCRIPT

806

GENERATE SYNTHETIC CONFERENCE TRANSCRIPT BASED ON
FIRST CONFERENCE TRANSCRIPT

900

902
GENERATE SYNTHETIC CONFERENCE TRANSCRIPTS USING A
NATURAL LANGUAGE PROCESSING ENGINE

904
COMPARE THE SYNTHETIC CONFERENCE TRANSCRIPTS WITH
CONFERENCE DATA TO IDENTIFY ARTIFACTS

906
PROVIDE ADDITIONAL TRAINING TO THE NATURAL LANGUAGE
PROCESSING ENGINE BASED ON THE ARTIFACTS

908
OUTPUT A PORTION OF THE SYNTHETIC CONFERENCE
TRANSCRIPTS

GENERATING SYNTHETIC CONFERENCE TRANSCRIPTS USING NATURAL LANGUAGE PROCESSING

FIELD

This disclosure generally relates to artificial intelligence, and, more specifically, to generating synthetic conference transcripts using natural language processing.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
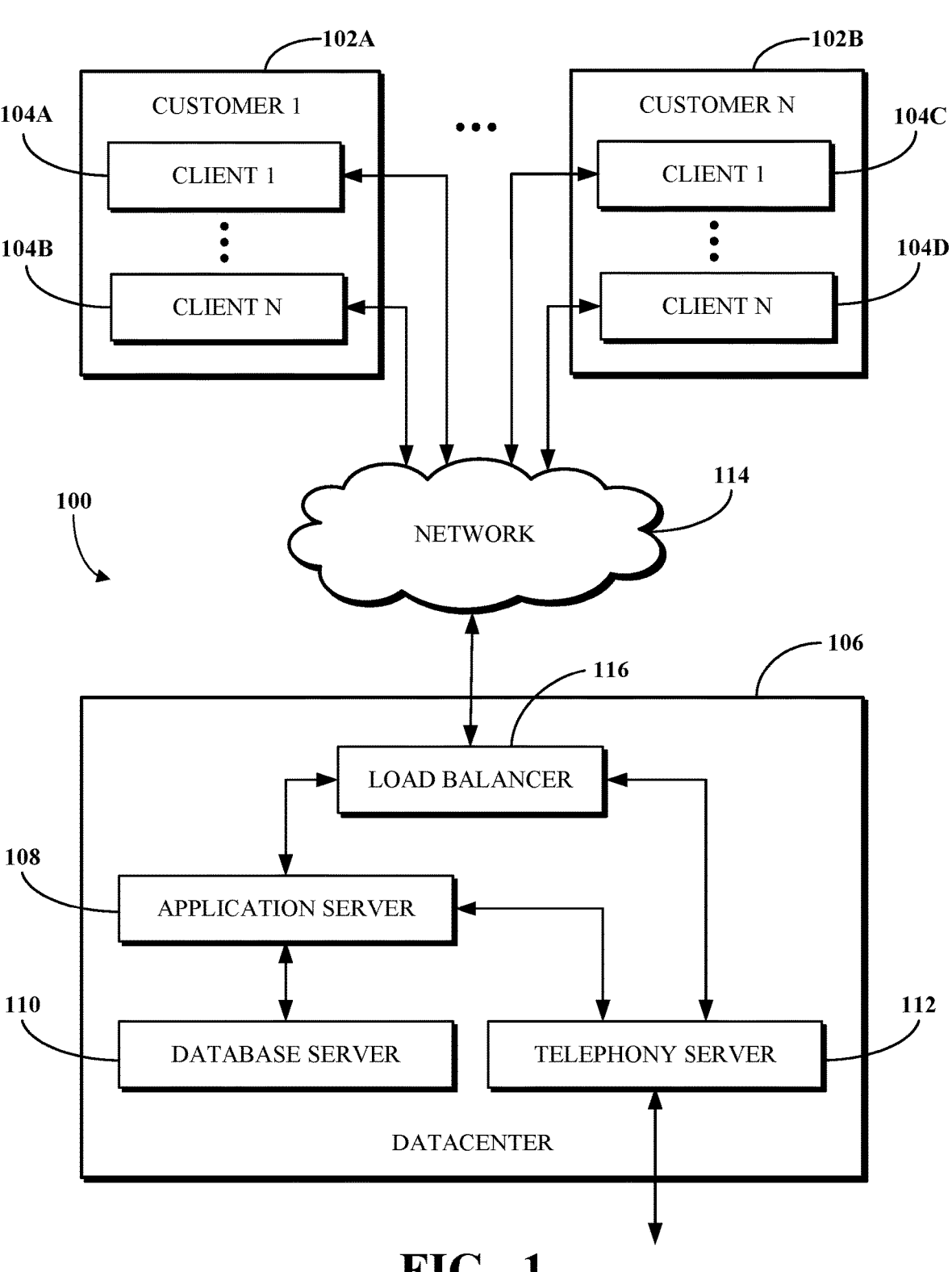
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

A provider of conferencing software may desire to provide artificial intelligence (AI) software to obtain information from the conference. For example, the AI software may be used to respond to queries about the conferences, label sections of conferences, or output next steps for participants in the conference. Such AI software may be trained using recordings or transcripts of conferences. However, in order to comply with privacy best practices or privacy laws in some jurisdictions, the provider of the conferencing software typically lacks access to those recordings or transcripts. Techniques for generating synthetic transcripts of conferences (e.g., machine-generated or AI-generated transcripts of fictitious conferences) may be desirable to provide training data for such artificial intelligence software.

Implementations of this disclosure address problems such as these by training, using a server system, a natural language processing (NLP) engine, such as a LLM or a generative pretrained transformer (GPT), to generate synthetic conference transcripts using multi-phase training. In a first phase of the multi-phase training, the NLP engine is trained to process natural language data (e.g., to predict a missing word in a sentence) leveraging a natural language training dataset that includes publicly accessible documents on the Internet, such as newspaper articles, encyclopedia articles, or blog posts. In a second phase of the multi-phase training, the NLP engine is finetuned to generate synthetic conference transcripts based on conference data from the real-world that is publicly accessible on the Internet. The conference data may include, for example, recordings or transcripts of at least one of a senate committee meeting, a presidential debate, a town hall hosted by a broadcaster, a public court trial, a National Archives Annual Open Meeting, or a podcast interview.

After the NLP engine is initially trained, the NLP engine generates synthetic conference transcripts. The synthetic conference transcripts may be associated with different prompts (e.g., "a senior law firm partner provides an annual review to a junior law firm associate," or "an interview of a fictitious author in the style of a specific National Public Radio interview of a real author") and different lengths. The server system compares (e.g., using AI or machine learning (ML) technology) the synthetic conference transcripts with conference data to identify artifacts in the synthetic conference transcripts. The server system provides additional training to the NLP engine using online learning based on the identified artifacts. The server system outputs a portion of the synthetic conference transcripts selected based on the identified artifacts.

In some cases, the server system trains, using the portion of the synthetic conference transcripts, a first AI engine to generate labels for sections of conference transcripts. Each label is associated with an intent. The intent may include a response to a query or an action item for a participant in the conference, and may be stored using a natural language tag. For example, a conference about employee benefits for employees of a business, may be labeled with action items (e.g., "employees are to register for the benefits by Friday at 17:00") and/or different sections of the conference (e.g., the section that discusses health benefits, dental benefits, and/or vision benefits) may be labeled so that the employees could easily refer back to those sections.

In some cases, the server system trains, using the portion of the synthetic conference transcripts, a second AI engine to respond to a query based on a conference transcript. For instance, in the conference about the employee benefits, an employee could use an employee device to transmit, to the AI engine, the question, "What dental plans are available?" In response, the AI would generate an answer to the question based on the transcript or recording of the employee benefits conference.

It should be noted that the first AI engine or the second AI engine may execute on a proprietary server system of a business. As a result, the server system that hosts the NLP engine might not have access to the employee benefits conference or other data that is used for inference by the first AI engine or the second AI engine.

In accordance with some examples of the technology disclosed herein, a NLP engine is used to generate synthetic conference transcripts. The synthetic conference transcripts are useful in training AI engines to gather intelligence from conference transcripts or conference recordings. These AI engines may be trained without relying on proprietary data (e.g., recordings of conferences that are not shared with the public). In some cases and with appropriate permissions granted by users associated with the proprietary data, the AI engines may leverage the proprietary data during the inference phase. However, the proprietary data is not accessed by the provider of the conferencing software as the inference by the AI engines may execute on machines associated with the users of the conferencing software and/or their employer (who may be a customer of the provider of the conferencing software).

In some examples of the present disclosure, implementations may include or otherwise use one or more AI/ML systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for generating synthetic conference transcripts. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers.

The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer

102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
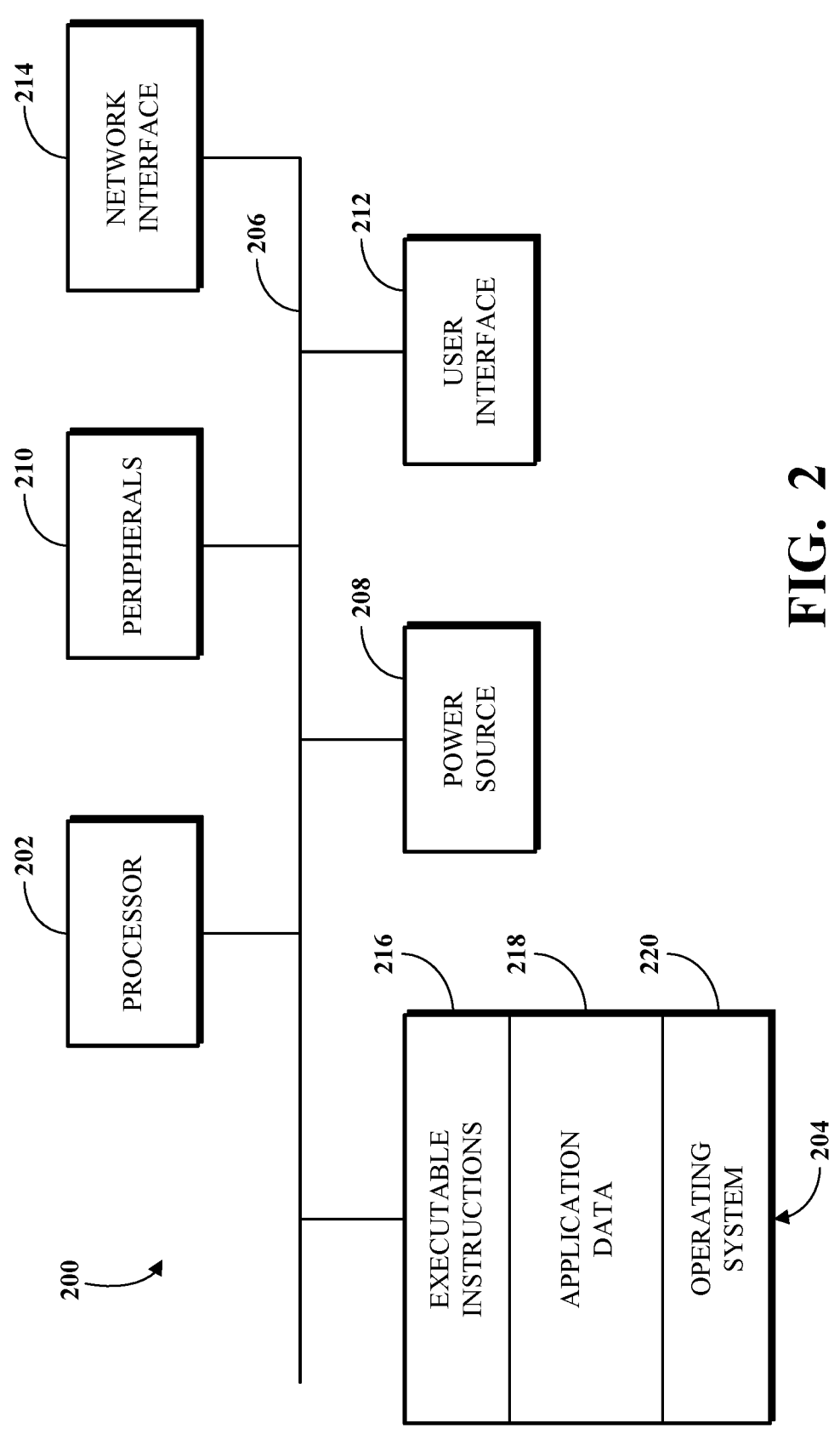
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
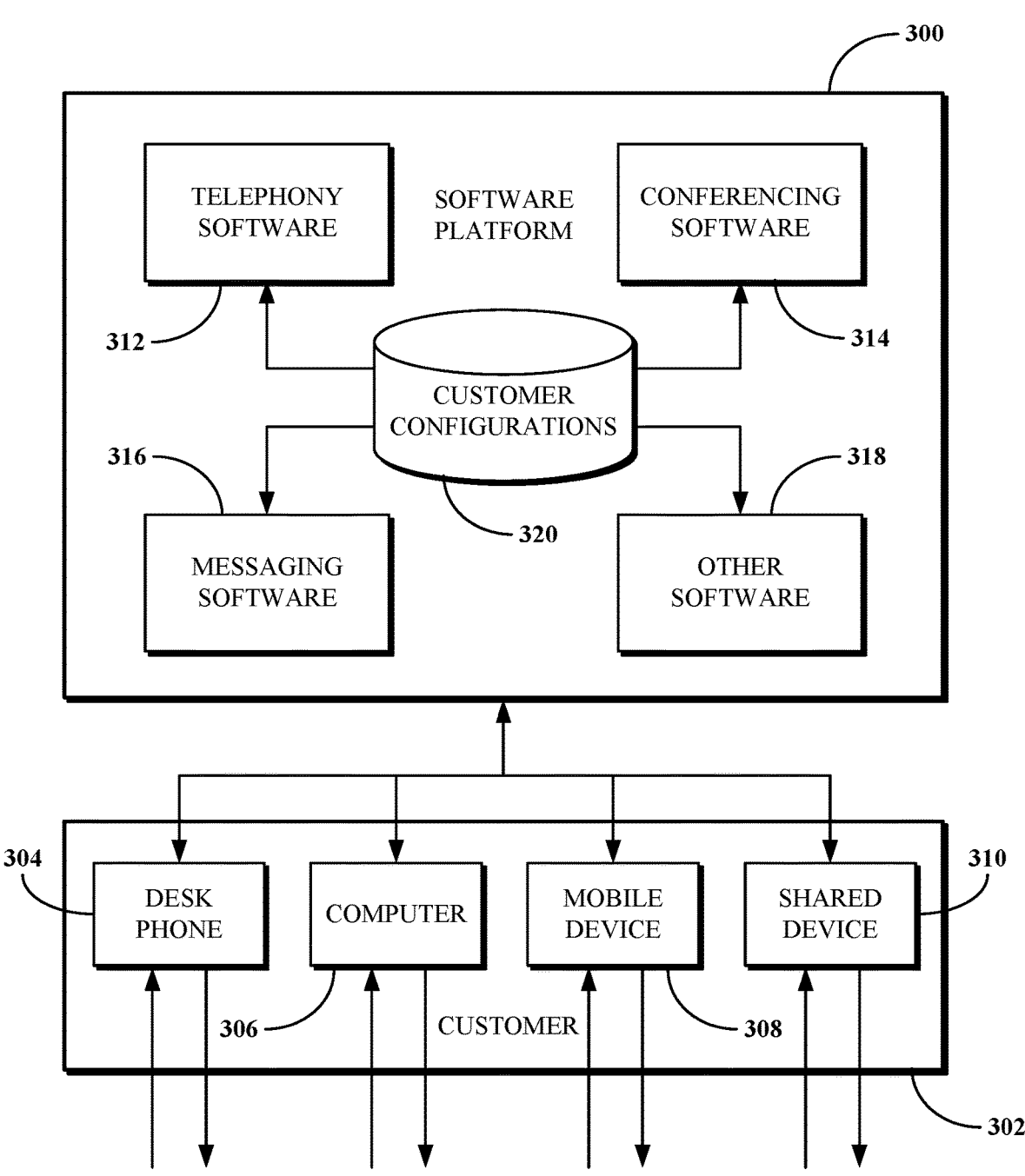
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for generating synthetic conference transcripts.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
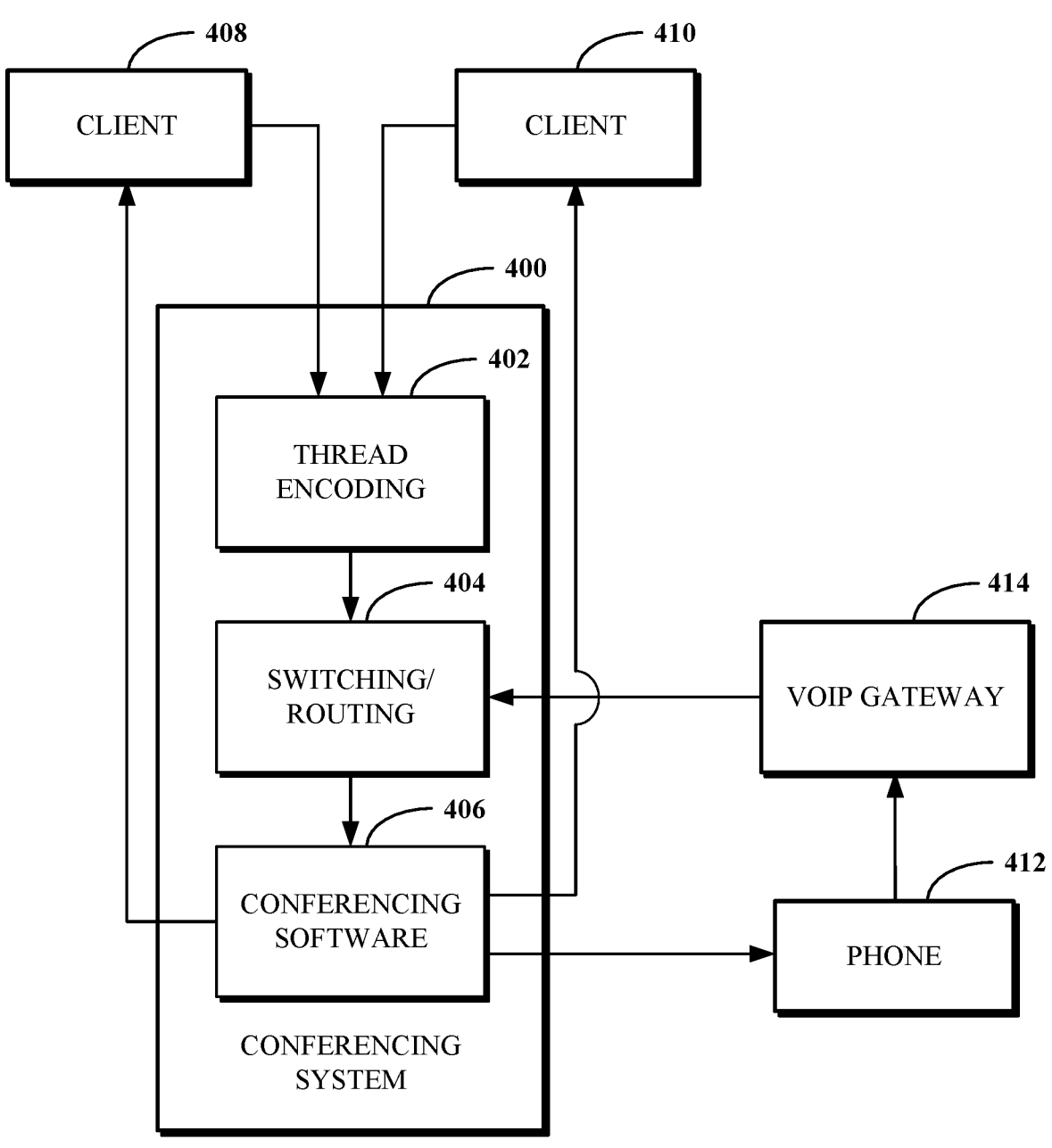
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
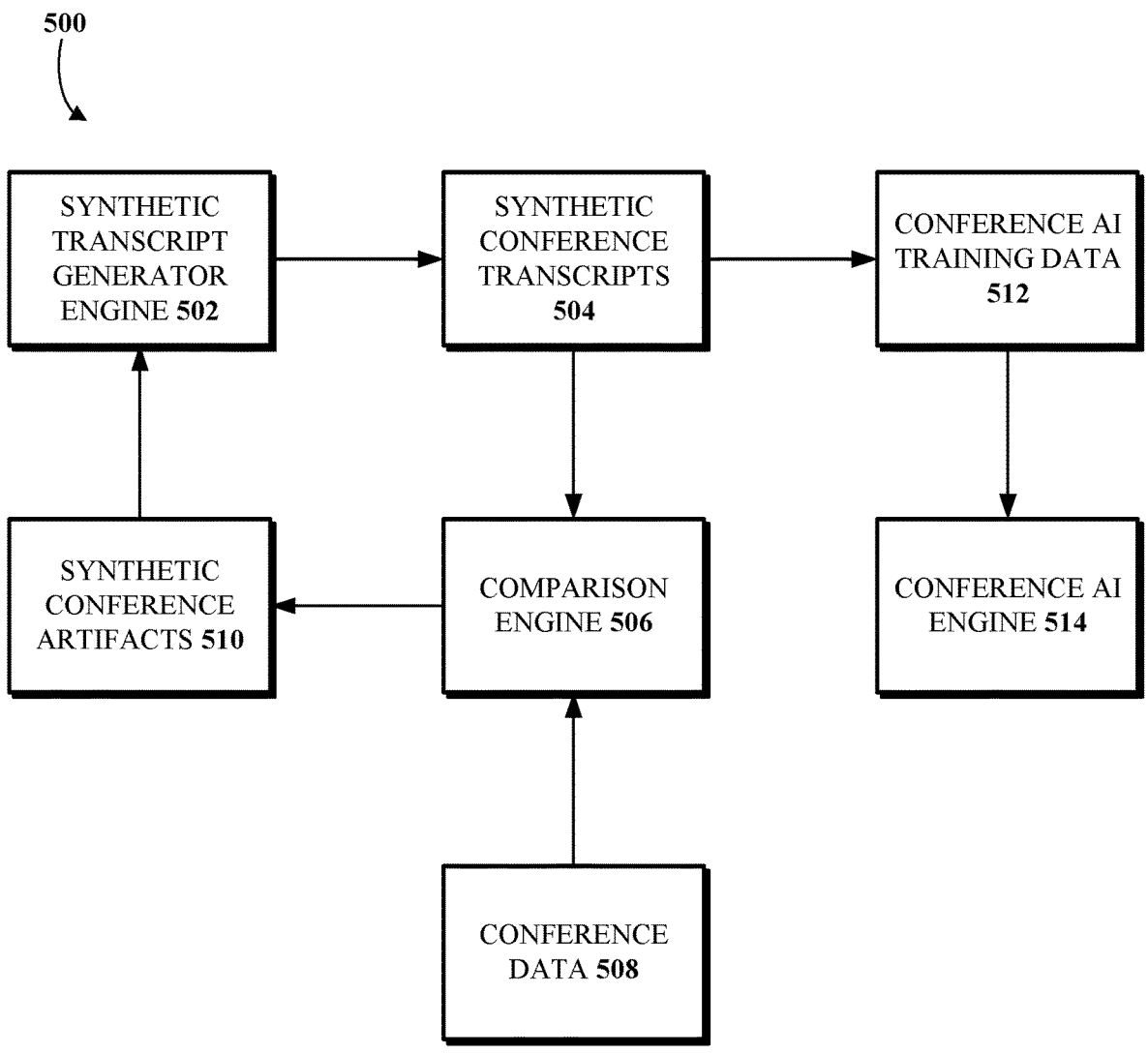
FIG. 5 is a block diagram of an example of a system for generating synthetic conference transcripts.

FIG. 5 is a block diagram of an example of a system 500 for generating synthetic conference transcripts. The system 500 may be implemented within at least one of a server or a data repository of the conferencing system 400. The server or the data repository may correspond to the computing device 200.

As shown, the system 500 includes a synthetic transcript generator engine 502. The synthetic transcript generator engine 502 is an AI-based NLP engine that generates synthetic conference transcripts 504 using the techniques described herein. According to some implementations, the synthetic transcript generator engine 502 selects a synthetic conference format (e.g., interview or town hall meeting) and a synthetic conference topic (e.g., job application or traffic congestion in the town). The synthetic transcript generator engine 502 generates a synthetic conference agenda based on the format and the top. For example, if the format is an interview and the topic is a job application, the format might be: (1) greeting, (2) interviewer asks job applicant about their work experience, (3) interviewer asks job applicant about their education experience, (4) job applicant asks interviewer questions about the job, and (5) conclusion and farewell. The synthetic transcript generator engine 502 then generates one of the synthetic conference transcripts 504 based on the synthetic conference agenda.

As shown, the synthetic conference transcripts 504 are provided to a comparison engine 506. The comparison engine 506 accesses conference data 508 from publicly accessible real-world data. For example, the publicly accessible real-world data may include recordings or transcripts of at least one of a senate committee meeting, a presidential debate, a town hall hosted by a broadcaster, a public court trial, a National Archives Annual Open Meeting, or a podcast interview. The comparison engine 506 includes at least one of a NLP engine (e.g., a GPT or a LLM) or an AI/ML engine. The NLP engine may implement AI/ML techniques. The comparison engine uses AI/ML techniques, as disclosed herein, to compare the conference data 508 with the synthetic conference transcripts 504 in order to identify synthetic conference artifacts 510 in the synthetic conference transcripts. The synthetic conference artifacts 510 include anomalies that distinguish the synthetic conference transcripts 504 from the conference data 508 and indicate (e.g., to a human) that the synthetic conference transcripts 504 are generated using AI/ML techniques and do not correspond to conferences that actually occurred in the real-world. For example, a conference might include a discussion between Anne, Bill, Carl, and Debra. Anne is Bill's boss, and Carl is Debra's boss. Anne and Bill are in a different department than Carl and Debra. During the conference, Anne might instruct Debra to complete a project and Debra might reply, "Yes, boss." The instructions from Anne to Debra and Debra's acceptance of the instructions are an example of a synthetic conference artifact 510 because in the real world, Anne would not provide instructions to Debra (instead, Anne would communicate with both Carl and Debra regarding what their department is to produce) and Debra would be surprised by those instructions from Anne and would not simply respond with, "Yes, boss."

As illustrated, the synthetic conference artifacts 510 are provided as training materials for the synthetic transcript generator engine 502. The synthetic transcript generator engine 502 uses online learning to recursively improve the quality of the synthetic conference transcripts 504 it generates based on the identified synthetic conference artifacts 510.

As further illustrated in FIG. 5, at least a portion of the synthetic conference transcripts 504 (e.g., the synthetic conference transcripts 504 that have less than a threshold number of synthetic conference artifacts 510) are provided as conference AI training data 512 to train a conference AI engine 514. The conference AI engine 514 may be any AI engine generates information based on conference recordings or conference transcripts. In one example, the conference AI engine 514 responds to a query based on a conference transcript or a conference recording. In another example, the conference AI engine 514 generates labels for sections of conferences, each section being associated with a common theme. In yet another example, the conference AI engine identifies next steps, discussed during the conference, for the conference participants.

As illustrated in FIG. 5, the conference AI engine 514 is trained based on the conference AI training data 512 residing at a server or at a data repository of a conferencing system. In some implementations, during the inference phase, the conference AI engine 514 may be transmitted to a server or a client device of a customer of the conferencing system. As such, the conferencing system might not access the private data of its customers. For example, employees of a widget manufacturer may discuss confidential matters during a conference. The recording of the conference may be stored at a server of the widget manufacturer, and may be accessed by the conference AI engine 514 residing at the server of the widget manufacturer. As a result, the widget manufacturer might benefit from using the conference AI engine 514 without sharing its confidential data with the conferencing service provider.

Figure 6:
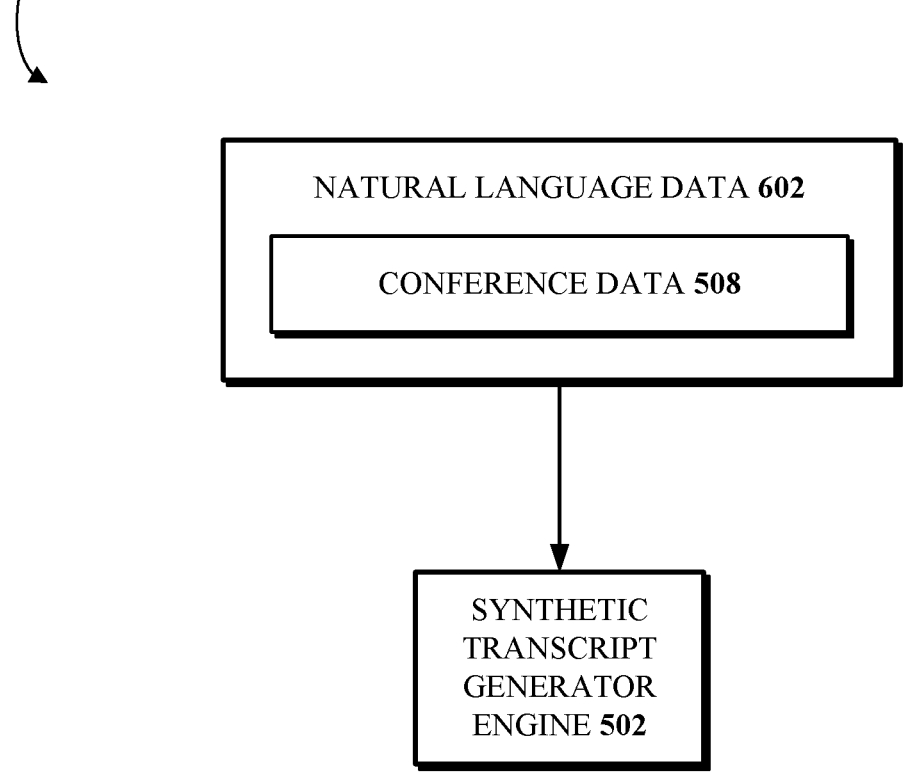
FIG. 6 is a block diagram of an example of a system for training a synthetic transcript generator engine.

FIG. 6 is a block diagram of an example of a system 600 for training a synthetic transcript generator engine. As shown, the system 600 includes natural language data 602, a subset of which is the conference data 508. The natural language data 602, including the conference data 508, is used to train the synthetic transcript generator engine 502, which is a NLP engine, such as a LLM or a GPT. The natural language data 602 includes publicly accessible documents, audio recordings, or video recordings on the Internet, such as newspaper articles, encyclopedia articles, blog posts, podcast recordings, or videos posted on a video sharing website.

In some cases, the synthetic transcript generator engine 502 that is trained using a two-phase process including the phases of pretraining and finetuning. In the pretraining phase, the synthetic transcript generator engine 502 is trained on the natural language data 602, which may include various publicly available (e.g., from the Internet) text data or audio/video data that is converted into text using speech-to-text technology. The publicly available text data may include text that is distinct from user input typically provided to the synthetic transcript generator engine 502 (e.g., requests to generate a transcript of a conference having certain features). For example, the various publicly available text data may include at least one of newspaper articles, blog posts, publicly available social media post, or encyclopedia articles. The text is used to create a language model that learns to predict the next word in a sentence given the context of the previous words. The transformer architecture, specifically the self-attention mechanism, may be used to capture dependencies between words and create a representation of the text.

During pretraining, the synthetic transcript generator engine 502 learns to generalize the patterns it observes in the training data. Specifically, the synthetic transcript generator engine 502 learns grammar, facts, reasoning abilities, and some level of world knowledge. The pretraining phase allows the synthetic transcript generator engine 502 to acquire a broad understanding of the natural languages in which the synthetic transcript generator engine 502 is trained.

During the finetuning phase, after pre-training, the synthetic transcript generator engine 502 is further finetuned on specific tasks (e.g., generating conference transcripts) using labeled examples. The labeled examples may be the conference data 508, which include transcripts or recordings of conferences that are publicly available, for example, televised government organization (e.g., city hall) meetings or podcast interviews. The labeled examples may include tags for the transcripts or recordings that summarize what transpired (e.g., "the head of the transportation department discussed traffic congestion and the need for public transportation with the mayor, the mayor noted that there are insufficient funds to alleviate the congestion or to improve public transportation, and that citizens would not be amenable to a tax increase"). The synthetic transcript generator engine 502 may be trained to generate the transcript (or a similar transcript) based on the tags. The finetuning phase makes the synthetic transcript generator engine 502 useful for specific applications, such as generating a conference transcript based on a tag. Finetuning involves training the synthetic transcript generator engine 502 on a narrower dataset that may be generated with the help of human reviewers (e.g., who generate the tags and/or write the conference transcripts).

The finetuning phase includes providing prompts or instructions to the synthetic transcript generator engine 502 and receiving responses from the synthetic transcript generator engine 502. For example, a human reviewer may identify a set conference transcripts for the conference data 508. The human reviewer then tags the conference transcripts with summaries thereof. The synthetic transcript generator engine 502 uses reinforcement learning to attempt to improve its scores on how closely a synthetic transcript generated based on the tags matches the actual transcript in the conference data 508.

Training of the comparison engine 506 (shown in FIG. 5) may follow a similar two-phase process to training of the synthetic transcript generator engine 502, described in conjunction with FIG. 6. A first phase may include a general language model training phase using the natural language data 602. A second phase may include specific training for identifying the synthetic conference artifacts 510, and may be performed based on labeled (e.g., by human reviewers) artifacts in the synthetic conference transcripts 504 generated by the synthetic transcript generator engine 502.

Figure 7:
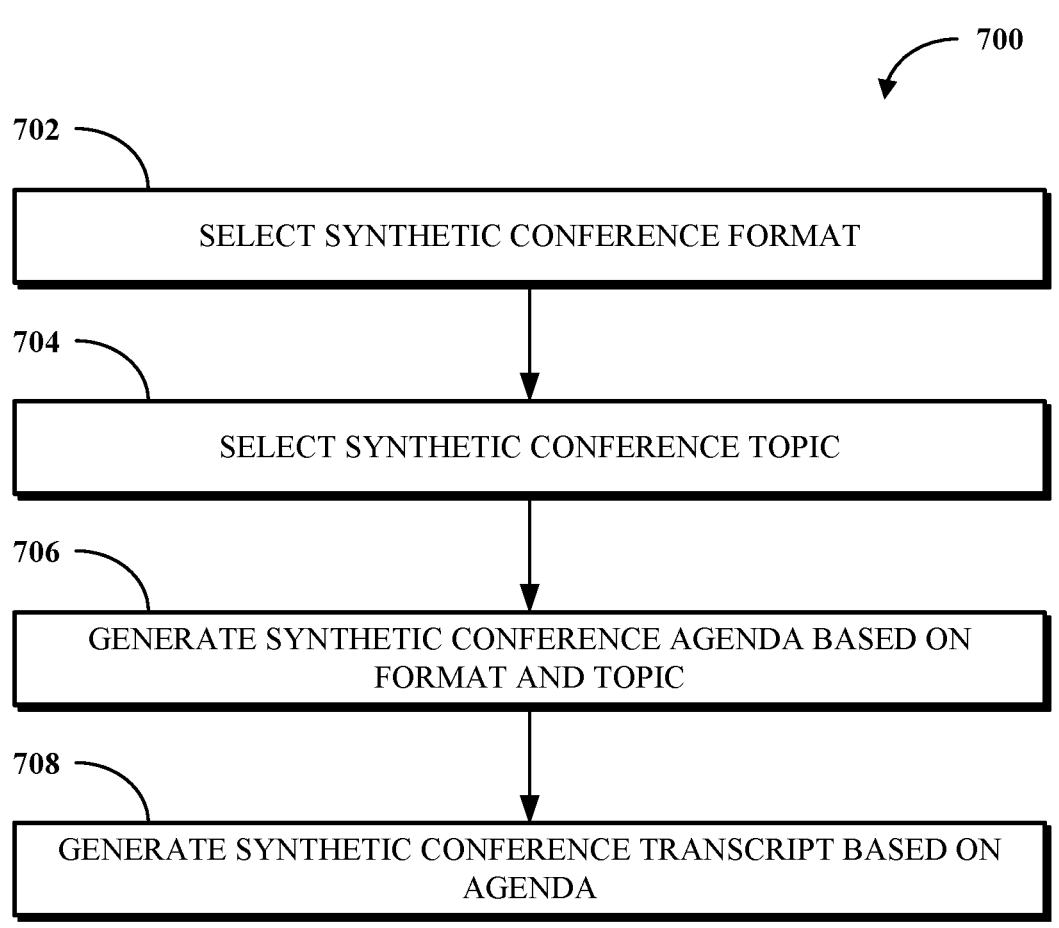
FIG. 7 is a flowchart of an example of a technique for generating a synthetic conference transcript based on a format and a topic.
Figure 8:
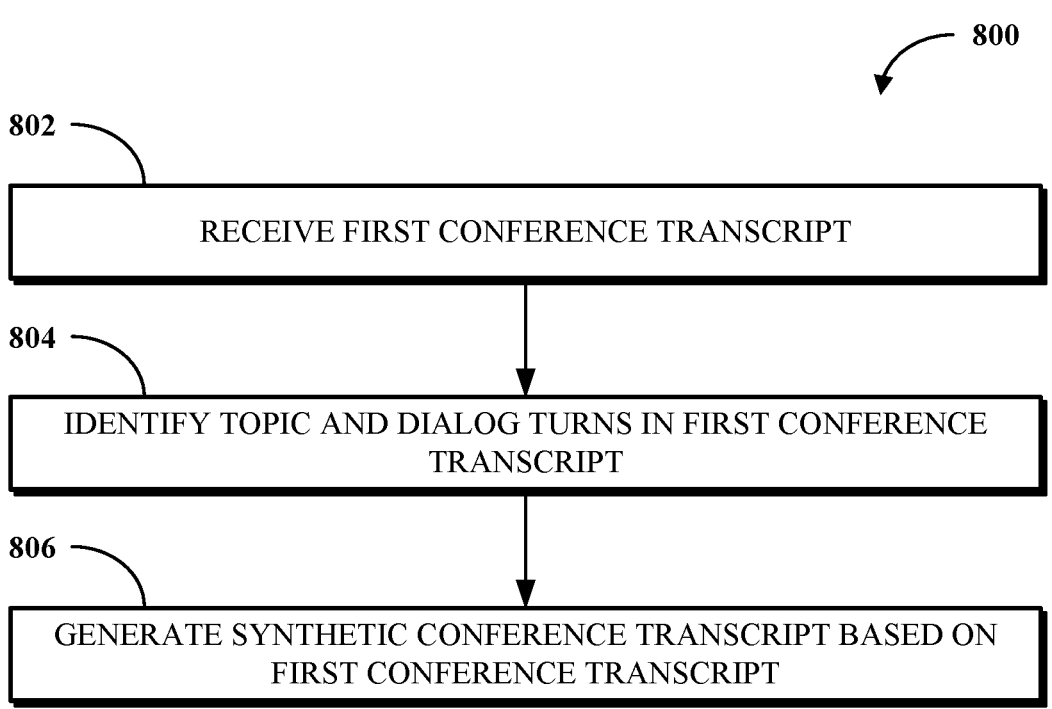
FIG. 8 is a flowchart of an example of a technique for generating a synthetic conference transcript based on another conference transcript.
Figure 9:
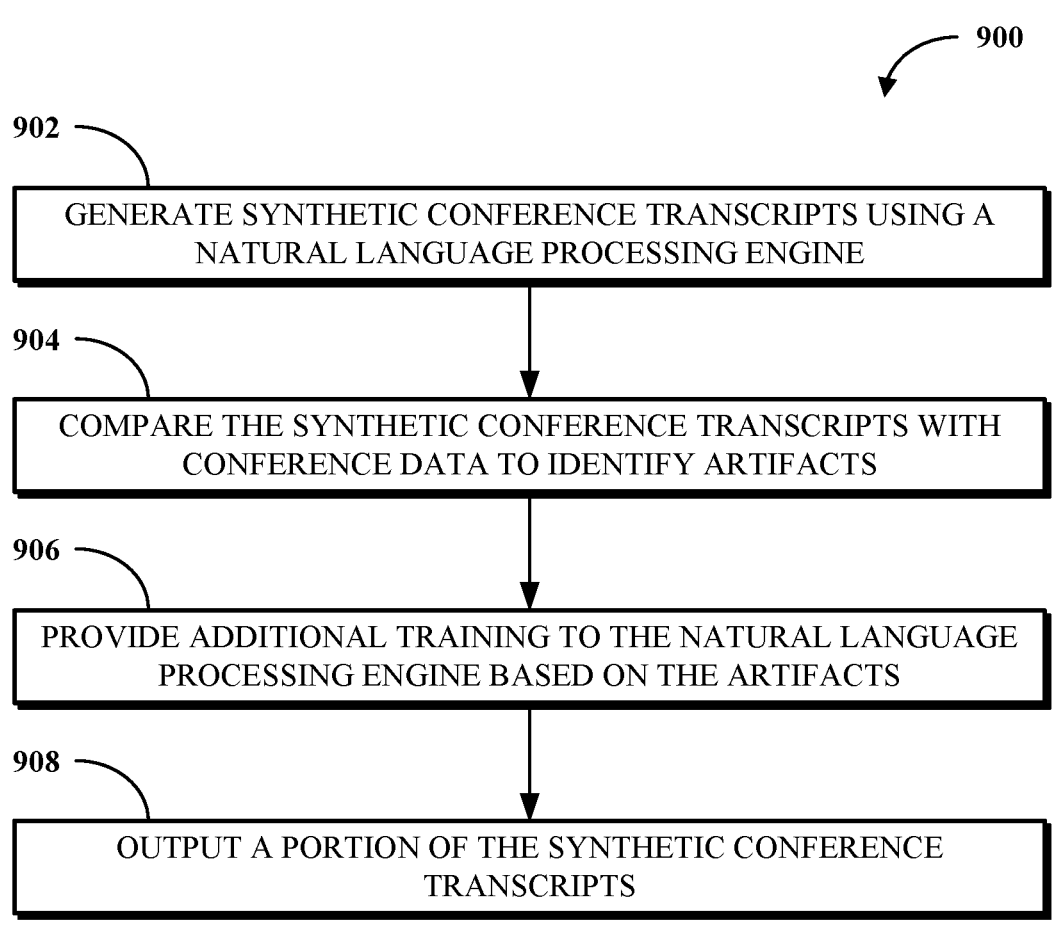
FIG. 9 is a flowchart of an example of a technique for generating synthetic conference transcripts using natural language processing.

To further describe some implementations in greater detail, reference is next made to examples of techniques which may be performed by or using a system for generating synthetic conference transcripts. FIG. 7 is a flowchart of an example of a technique 700 for generating a synthetic conference transcript based on a format and a topic. FIG. 8 is a flowchart of an example of a technique 800 for generating a synthetic conference transcript based on another conference transcript. FIG. 9 is a flowchart of an example of a technique 900 for generating synthetic conference transcripts using natural language processing. The techniques 700, 800, and/or 900 can be executed using computing devices, such as the systems, hardware, and software described with respect to FIGS. 1-6. The techniques 700, 800, and/or 900 can be performed, for example, by executing a machine-readable program or other computer-executable instructions, such as routines, instructions, programs, or other code. The steps, or operations, of the techniques 700, 800, 900, or another technique, method, process, or algorithm described in connection with the implementations disclosed herein can be implemented directly in hardware, firmware, software executed by hardware, circuitry, or a combination thereof.

For simplicity of explanation, the techniques 700, 800, and 900 are depicted and described herein as a series of steps or operations. However, the steps or operations of the techniques 700, 800, and/or 900 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 7 illustrates the technique 700 for generating a synthetic conference transcript based on a format and a topic. The technique 700 may be performed by a server which includes all or a portion of at least one of the system 500 or the system 600.

At 702, the server selects a synthetic conference format. The synthetic conference format may correspond to at least one of a one-on-one meeting, a team meeting, a board meeting, a staff meeting, a committee meeting, a workshop/training session, a town hall meeting, a virtual meeting, a stand-up meeting, or a brainstorming meeting. The synthetic conference format may be specified via a user input. Alternatively, the synthetic conference format may be determined using at least one of a pseudo-random number generator or a clock signal.

A one-on-one meeting may include a meeting between two people, which may correspond to a performance review, a check-in, or a feedback session. A team meeting may include a meeting of a whole team, department or other group (or at least a threshold percentage, such as 60% or 80% of the team, department or other group) to discuss updates, projects, or strategies. A board meeting may include a meeting by a company's board of directors to discuss strategic direction, company performance, and high-level decisions. A staff meeting may include a regular meeting that includes all or at least a threshold number of staff to share updates, strategies, and/or company-wide notifications. A committee meeting may include a meeting for a specific committee with an organization to discuss specific projects or initiatives. A workshop/training session includes an educational meeting where participants are trained on a new skill or process. A town hall meeting includes a larger scale meeting where information is given to a large group (e.g., of employees) and often includes a question-and-answer session (e.g., at the end). A virtual meeting may correspond to any of the above or below meeting types, and may be conducted over a network using video conferencing software rather than in-person. A stand-up meeting is a quick, typically daily meeting meant to synchronize a team's activities and set the day's agenda. A brainstorming meeting may include a group convening with the goal of generating fresh ideas and solutions around a specific business challenge or issue.

At 704, the server selects a synthetic conference topic. The synthetic conference topic may correspond to at least one of strategic planning, financials, operations, marketing and sales, human resources, technology, health and safety, compliance and legal, customer relations, and/or research and development. The synthetic conference topic may be specified via a user input. Alternatively, the synthetic conference topic may be determined using at least one of a pseudo-random number generator or a clock signal.

The strategic planning topic may include discussions of company goals, action plans, market trends, competitive analysis, and future prospects. The financials topic may include discussions of financial performance, budgeting, cost management, revenue projections, and other financial aspects of the business. The operations topic may include manufacturing procedures in manufacturing industries, service delivery in information technology companies, and/or product launches in retail businesses. The marketing and sales topic may include discussions of branding strategies, promotional activities, customer feedback, sales targets, and/or market expansion plans. The human resources topic may include discussions on recruitment strategies, employee satisfaction, performance management, training, and/or development opportunities. The technology topic may include meetings may revolve around product development, software updates, project management, and innovation. The health and safety topic may include discussions of safety standards, accident reports, and prevention strategies. The compliance and legal topic may include discussions of updates in laws or regulations relevant to the company's operation, addressing legal issues, and/or aligning company policies with the legislation. The customer relations topic may include discussions of customer engagement, handling customer complaints, improving customer experience, and/or discussing customer loyalty programs. The research and development topic may include discussions of updates on research and development, innovation, and new product development.

At 706, the server generates a synthetic conference agenda based on the format (identified at 702) and the topic (identified at 704). In some implementations, the server generates the synthetic conference agenda using a NLP engine (e.g., a LLM or a GPT) configured to generate natural language responses to natural language prompts. The natural language prompt may be, for example: "You are an experienced businessperson and you are planning a <<conference format>> conference to discuss <<conference topic>>. Write the agenda for this conference." In the above prompt, <<conference format>> corresponds to the format identified at 702 and <<conference topic>> corresponds to the conference topic identified at 704. In some cases, additional inputs may be provided to the NLP engine in conjunction with the above prompt. The additional inputs may include at least one of the type of industry, the size or structure of the company, or a current market scenario. For example, the prompt could state, "You are an experienced businessperson and you are planning a workshop/training session virtual meeting conference to discuss compliance and legal issues. Write the agenda for the conference. The attendees are executives and board members of a real estate investment trust that invests in apartment complexes in the southeastern United States. It is January 2018, and the Tax Cuts and Jobs Act was just passed in the United States."

At 708, the server generates a synthetic conference transcript based on the agenda. In some implementations, the NLP engine is provided with a prompt stating: "Generate a transcript of the conference based on the agenda created in response to the previous prompt." In some cases, the synthetic transcript generator engine 502 is used to generate the synthetic conference transcript based on the agenda.

In one example use case, a server is to generate a synthetic conference transcript based on a format and a topic. The server pseudo-randomly (e.g., based on a random number generator that is seeded by a clock signal) selects the format and the topic. According to the example use case, the selected format is "one-on-one meeting," and the selected topic is "job interview." Using pseudo-random selection, the restaurant industry is selected. A NLP engine of the server determines that the likely participants in the job interview is an applicant for a chef position and a restaurant manager.

Based on the above information, the server provides the following prompt to a NLP engine: "You are an experienced businessperson and you are planning a ONE-ON-ONE MEETING conference to discuss JOB INTERVIEW. The industry is RESTAURANT. The participants are RESTAURANT MANAGER and APPLICANT FOR CHEF POSITION. Write the agenda for this conference." In response, the NLP engine may generate the following agenda: "(1) Introduction and welcome, (2) Applicant's background and experience, (3) Applicant's questions, and (4) Conclusion." It should be noted that the agenda might include more details.

After generating the above agenda, the server provides the NLP engine with a prompt to generate the transcript of the conference. The server may generate the transcript based on the above agenda. A simplified example of the generated transcript is shown in Table 1 below. It should be noted other transcripts generated using the disclosed technique may be much longer.

TABLE 1

| Example Transcript |
| --- |
| RAMONA: Hello. Thank you for coming to the interview. My name is Ramona. I am the manager at ABC Restaurant. |
| CHRIS: Hello. I am Chris. Thank you for reviewing my application for the chef position and for taking the time to interview me. |
| RAMONA: Please tell me about your previous experience. |
| CHRIS: I was a sous chef at DEF Restaurant for two years before DEF Restaurant closed last summer. After that, I took a few months off to travel, and have been searching for a new position since I came back home a few weeks ago. |
| RAMONA: What dishes have you prepared at DEF Restaurant? |
| CHRIS: I specialized in pasta dishes, but I have also prepared steak and seafood. |
| RAMONA: I see. Do you have any questions for me? |
| CHRIS: Yes. What are the hours and wages for the position? |
| RAMONA: We pay $25 per hour, and the position requires 20 hours per week during our dinner hours. Is this in line with your expectations? |
| CHRIS: That would work for me. |
| RAMONA: Thank you for coming in. I am very impressed with your background and experience. I am considering several applicants and I expect to make a decision after I finish interviewing all of them within the next week. |
| CHRIS: Thank you for your time and consideration. I look forward to hearing from you soon. |

FIG. 8 illustrates the technique 800 for generating a synthetic conference transcript based on another conference transcript. The technique 800 may be performed by a server which includes all or a portion of at least one of the system 500 or the system 600.

At 802, the server receives a first conference transcript. The first conference transcript may be a real-world conference transcript that is publicly accessible. For example, the first conference transcript may be a transcript of a video recording of a conference that was shared on a public video sharing website.

At 804, the server identifies a topic and dialog turns in the first conference transcript using NLP techniques. The topic may be one of the topics discussed in conjunction with FIG. 7, and may be determined using AI/ML techniques, for example, a convolutional neural network trained to classify text by topic. The dialog turn may refer to the smallest unit of spoken language in a conversation, corresponding to one person's complete speaking slot within a back-and-forth exchange. A dialog turn may include a speaker and an utterance. The speaker is the person who is currently talking. The utterance is the specific words used by the speaker during their turn. This may include a full sentence, a paragraph, a single word, or a sound (e.g., "umm" or "uh-huh"). Dialog turns may be identified by change of speaker, completion of a Gedanke (a unit of thought or meaning), or a potential for response.

Dialog turns can vary in length and complexity. Some dialog turns may be just a word or two, like "hello," "okay," or "Yes, sir," while others may be much longer, like a story or an explanation. The length and complexity of a dialog turn may depend on the context of the conversation, the relationship between the speakers, and/or the speaker's goals. For example, in first line of the transcript of Table 1, Ramona says, "Hello. Thank you for coming to the interview. My name is Ramona. I am the manager at ABC Restaurant." The word "Hello" is a dialog turn because it completes a Gedanke and provides a potential for response. Each of the next three sentences—"Thank you for coming to the interview," "My name is Ramona," and "I am the manager at ABC Restaurant"—also comprise individual dialog turns because each one of them completes a Gedanke, and the last one is associated with a change of speaker at the end.

At 806, the server generates a synthetic conference transcript based on the first conference transcript. The synthetic conference transcript may have the same topic (or a similar topic that is not the same topic) as the first conference transcript and may include dialog turns similar to the first transcript. The NLP engine used by the server to generate the synthetic conference transcript is capable of identifying and imitating dialog turns. The NLP engine may be provided with a definition and an explanation of what dialog turns are, as well as training data on identifying dialog turns. Alternatively, the NLP engine may be capable of defining, identifying, and/or copying dialog turns based on information within the set of data (e.g., the natural language data 602) used to train the NLP engine.

In one example use case, imagine that the transcript in Table 1 is a transcript of a real interview that is publicly available. A NLP engine of the server accesses the transcript in Table 1 and identifies the topic to be a job interview for a chef position at a restaurant. The server provide the NLP engine with the prompt: "You are a conference assistant. Design a conference based on the transcript in Table 1, including a similar topic and similar dialog turns to the transcript in Table 1. However, pseudo-randomly select a different industry in which the designed conference takes place." It should be noted that this prompt could be stored in the memory of the server and used to automatically generate synthetic conference transcripts based on real conference transcripts, with the phrase "transcript in Table 1" replaced with a reference to another transcript.

In response to the above prompt, the NLP engine pseudo-randomly selects the legal industry as the different industry. The NLP engine then generates the transcript shown in Table 2. It should be noted that the transcript shown in Table 2 has the same topic (job interview) and similar dialog turns to the transcript shown in Table 1, but takes place in the legal industry instead of the restaurant industry.

TABLE 2

| Example Transcript |
| --- |
| PETER: Hello. Thank you for submitting your job application. My name is Peter, and I am the senior partner.<br>ANNA: Hi Peter. I'm Anna. Thanks for taking the time to review my application and interview me.<br>PETER: Tell me about your work experience so far.<br>ANNA: I was a junior attorney at Acme Corporation for three years after I graduated from law school. After Acme's bankruptcy and staff layoff, I took a few months off to travel. Now, I'm back in New York and searching for a job again.<br>PETER: What legal matters have you worked on at Acme.<br>ANNA: I worked mostly in securities compliance, but also assisted with the bankruptcy and did some litigation work.<br>PETER: Sounds interesting. What questions do you have for me?<br>ANNA: What is the salary range for the job?<br>PETER: We pay $80,000 per year, and it is a full-time position. Does this work for you?<br>ANNA: Sounds good.<br>PETER: Thank you for your time, Anna. I enjoyed our conversation. The firm received multiple applicants, and we plan to make a decision in the next two weeks.<br>ANNA: Thanks Peter. I hope to hear back from the firm soon. |

FIG. 9 illustrates the technique 900 for generating synthetic conference transcripts using natural language processing. The technique 900 may be performed by a server which includes all or a portion of the system 500.

At 902, the server generates, using a NLP engine (e.g., the synthetic transcript generator engine 502), synthetic conference transcripts (e.g., the synthetic conference transcripts 504). The synthetic conference transcripts may be generated using the techniques described herein. For example, the technique 700 and/or the technique 800 may be used. In some cases, the synthetic conference transcripts are be generated by prompting the NLP engine to generate a synthetic conference transcript based on an input (e.g., a similar conference or a conference agenda, with the conference agenda itself being generated by the NLP engine or being identified based on a conference agenda that is available to the public via the Internet).

At 904, the server compares (e.g., using the comparison engine 506) the synthetic conference transcripts with conference data (e.g., the conference data 508) to identify artifacts in the synthetic conference transcripts (e.g., the synthetic conference artifacts 510). The conference data may include transcripts or recordings of conferences that took place in the real-world and included real human participants. The conference data may be obtained from publicly accessible pages on the Internet.

At 906, the server provides additional training to the NLP engine using online learning based on the identified artifacts. For example, the NLP engine may be provided with training data identifying the artifacts. The NLP engine may be prompted to generate future synthetic conference transcripts that lack the artifacts. In some cases, after completing 906, the technique 900 returns to 902 (instead of continuing to 908). As a result, 902, 904, and 906 may be recursively repeated multiple times, with the NLP engine successively improving its performance at generating synthetic conference transcripts that include few artifacts.

At 908, the server outputs a portion of the synthetic conference transcripts selected based on the identified artifacts. For example, the server may output conference transcripts having less than a threshold number of artifacts or transcripts having a number of artifacts divided by words in transcript value that is below a threshold value. The outputted portion of the synthetic conference transcripts may be used as training data for an AI/ML engine that generates labels for parts of conference transcripts, with each label being associated with an intent. The labels may include natural language tags for a portion of a transcript or a recording of a conference. For example, a conference that discusses real estate investment in Texas and Florida may be labeled with a "Texas" section and a "Florida" section. The outputted portion of the synthetic conference transcripts may be used as training data for an AI/ML engine that responds to queries based on a conference transcript. For example, the AI/ML engine may be trained to answer the question, "Where did the applicant work previously?" based on a transcript of a job interview (e.g., as shown in Table 1 and Table 2).

In an example use case, a service provider of audio conferencing services and video conferencing services desires to leverage AI/ML to allow its users to obtain intelligence from conferences (e.g., to have questions about conferences answered, to identify next steps for participants in conference, or to automatically label parts of conference recordings and transcripts). In order to train AI/ML engines to perform these tasks, the service provider may leverage conference transcripts. However, as there are few publicly accessible conference transcripts available, the service provider may generate synthetic conference transcripts using a GPT engine. The service provider may initially prompt the GPT engine to generate conference transcripts for various scenarios that mimic publicly available podcast interviews. For example, to mimic a podcast that interview famous authors, the service provider may prompt the GPT engine as follows: "You are an experienced journalist, and you are interviewing the author of fiction books for <<target audience>> having the topic of <<topic>>. What questions do you ask? How does the author answer?" In the prompt above, the values of <<target audience>> and <<topic>> are obtained from predefined sets of target audiences (e.g., senior citizens, adults, young adults, children, political liberals, political conservatives, people living in the northern United States, and/or people living in the southern United States) and topics (e.g., mystery, adventure, drama, romance, and/or comedy). The service provider may cause the GPT engine to generate multiple synthetic transcripts using the above prompt.

The service provider may repeat the above technique to generate synthetic conferences that are not podcast interviews of authors. For example, a similar technique may be used for legislature sessions and/or court trials. Specifically, the GPT engine may be prompted to generate synthetic legislature sessions and/or court trials associated with certain topics that are similar to the topics of real-world legislature sessions and/or real-world court trials.

After the synthetic conference transcripts are generated, the service provider leverages GPT technology to review the synthetic conference transcripts and the real-world conference transcripts in order to identify artifacts of the synthetic conference transcripts. For example, a GPT engine may be provided with the prompt: "The transcripts stored at X are real world conference transcripts. The transcripts stored at Y are AI-generated conference transcripts. Your task is to identify artifacts in the AI-generated conference transcripts. Please identify and flag as many artifacts as possible." In the above prompt, X and Y may refer to storage locations, for example, directories in a file system.

After identifying the artifacts, the service provider trains the GPT engine that generated the conference transcripts, using online learning, to generate transcripts lacking the identified artifacts or similar artifacts. Specifically, the artifacts are provided as training data, along with an indication that such artifacts are not to be included in synthetic conference transcripts. Using these training data, the GPT engine is trained to generate conference transcripts having fewer artifacts. The GPT engine may then generate additional conference transcripts, and this training and generation process may be recursively repeated multiple times.

After multiple synthetic conference transcripts are generated, the service provider automatically selects a subset of the synthetic conference transcripts to use to train the AI/ML to allow the users to obtain intelligence from conferences. For example, the subset used for the training may be automatically selected to include synthetic conference transcripts that lack identified artifacts and/or synthetic conference transcripts that were generated after at least n phases of online learning based on the artifact data were completed, where n is a positive integer.

Some implementations are described below as numbered examples (Example 1, 2, 3, etc.). These examples are provided as examples only and do not limit the other implementations disclosed herein.

Example 1 is a method, comprising: generating, using a natural language processing engine, synthetic conference transcripts; comparing the synthetic conference transcripts with conference data to identify artifacts in the synthetic conference transcripts; providing additional training to the natural language processing engine using online learning based on the identified artifacts; and outputting a portion of the synthetic conference transcripts selected based on the identified artifacts.

In Example 2, the subject matter of Example 1 includes, initially training the natural language processing engine to generate the synthetic conference transcripts using multi-phase training, a first phase of the multi-phase training leveraging natural language data, and a second phase of the multi-phase training leveraging the conference data.

In Example 3, the subject matter of Examples 1-2 includes, training, using the portion of the synthetic conference transcripts, an artificial intelligence engine to generate labels for sections of conference transcripts, each label being associated with an intent.

In Example 4, the subject matter of Examples 1-3 includes, training, using the portion of the synthetic conference transcripts, an artificial intelligence engine to respond to a query based on one or more conference transcripts.

In Example 5, the subject matter of Examples 1-4 includes, wherein the conference data comprises at least one of transcripts or recordings of real-world conferences that are available via a public network.

In Example 6, the subject matter of Examples 1-5 includes, wherein the conference data is a subset of natural language data used to initially train the natural language processing engine.

In Example 7, the subject matter of Examples 1-6 includes, wherein the natural language processing engine comprises at least one of a large language model or a generative pretrained transformer.

Example 8 is a non-transitory computer readable medium storing instructions operable to cause one or more processors to perform operations comprising: generating, using a natural language processing engine, synthetic conference transcripts; comparing the synthetic conference transcripts with conference data to identify artifacts in the synthetic conference transcripts; providing additional training to the natural language processing engine using online learning based on the identified artifacts; and outputting a portion of the synthetic conference transcripts selected based on the identified artifacts.

In Example 9, the subject matter of Example 8 includes, the operations further comprising: initially training the natural language processing engine to generate the synthetic conference transcripts using two-phase training, a first phase of the two-phase training leveraging natural language data, and a second phase of the two-phase training leveraging the conference data.

In Example 10, the subject matter of Examples 8-9 includes, the operations further comprising: training, using the portion of the synthetic conference transcripts, an artificial intelligence engine to generate labels for sections of conference transcripts.

In Example 11, the subject matter of Examples 8-10 includes, the operations further comprising: training, using the portion of the synthetic conference transcripts, an artificial intelligence engine to respond to a query based on at least one of a conference transcript or a conference recording.

In Example 12, the subject matter of Examples 8-11 includes, wherein the conference data comprise transcripts or recordings of real-world conferences, wherein the transcripts of the real-world conferences or the recordings of the real-world conferences are available via a public network.

In Example 13, the subject matter of Examples 8-12 includes, wherein the conference data is a subset of text or audio data used to initially train the natural language processing engine.

In Example 14, the subject matter of Examples 8-13 includes, wherein the natural language processing engine comprises a generative pretrained transformer.

Example 15 is a system, comprising: a memory subsystem; and processing circuitry configured to execute instructions stored in the memory subsystem to: generate, using a natural language processing engine, synthetic conference transcripts; compare the synthetic conference transcripts with conference data to identify artifacts in the synthetic conference transcripts; provide additional training to the natural language processing engine using online learning based on the identified artifacts; and output a portion of the synthetic conference transcripts selected based on the identified artifacts.

In Example 16, the subject matter of Example 15 includes, the processing circuitry further configured to execute the instructions stored in the memory subsystem to: initially train the natural language processing engine to generate the synthetic conference transcripts using multi-phase training, at least one phase of the multi-phase training leveraging the conference data.

In Example 17, the subject matter of Examples 15-16 includes, the processing circuitry further configured to execute the instructions stored in the memory subsystem to: train, using the portion of the synthetic conference transcripts, an artificial intelligence engine to generate labels for sections of conference transcripts, each label being associated with a natural language tag.

In Example 18, the subject matter of Examples 15-17 includes, the processing circuitry further configured to execute the instructions stored in the memory subsystem to: train, using the portion of the synthetic conference transcripts, a machine learning engine to respond to a query based on one or more conference transcripts.

In Example 19, the subject matter of Examples 15-18 includes, wherein the conference data comprise transcripts of real-world conferences that are available via a public network.

In Example 20, the subject matter of Examples 15-19 includes, wherein the natural language processing engine comprises a large language model.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer-readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry. The memory subsystem may include a single memory unit or multiple joint or disjoint memory units, which each of the multiple joint or disjoint memory units storing all or a portion of the data described as being stored in the memory subsystem.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

As used herein, the term "and/or" encompasses its plain and ordinary meaning and may refer to an intersection or a union of sets of data. For example, the phrase "A and/or B" encompasses the union of A and B. The phrase "A and/or B" encompasses the intersection of A and B.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device. Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
generating, using a natural language processing engine, synthetic conference transcripts;
comparing the synthetic conference transcripts with conference data to identify artifacts in the synthetic conference transcripts, wherein the artifacts comprise anomalies that distinguish the synthetic conference transcripts from the conference data and indicate that the synthetic conference transcripts are generated using artificial intelligence techniques and do not correspond to real-world conferences;
providing additional training to the natural language processing engine using online learning based on the identified artifacts, wherein comparing the synthetic conference transcripts and providing the additional training are recursively repeated to successively improve performance of the natural language processing engine at generating synthetic conference transcripts that include fewer artifacts; and
outputting a portion of the synthetic conference transcripts selected based on the identified artifacts.

2. The method of claim 1, further comprising:
initially training the natural language processing engine to generate the synthetic conference transcripts using multi-phase training, a first phase of the multi-phase training leveraging natural language data, and a second phase of the multi-phase training leveraging the conference data.

3. The method of claim 1, further comprising:
training, using the portion of the synthetic conference transcripts, an artificial intelligence engine to generate labels for sections of conference transcripts, each label being associated with an intent.

4. The method of claim 1, further comprising:
training, using the portion of the synthetic conference transcripts, an artificial intelligence engine to respond to a query based on one or more conference transcripts.

5. The method of claim 1, wherein the conference data comprises at least one of transcripts or recordings of real-world conferences that are available via a public network.

6. The method of claim 1, wherein the conference data is a subset of natural language data used to initially train the natural language processing engine.

7. The method of claim 1, wherein the natural language processing engine comprises at least one of a large language model or a generative pretrained transformer.

8. A non-transitory computer readable medium storing instructions operable to cause one or more processors to perform operations comprising:
generating, using a natural language processing engine, synthetic conference transcripts;
comparing the synthetic conference transcripts with conference data to identify artifacts in the synthetic conference transcripts, wherein the artifacts comprise anomalies that distinguish the synthetic conference transcripts from the conference data and indicate that the synthetic conference transcripts are generated using artificial intelligence techniques and do not correspond to real-world conferences;
providing additional training to the natural language processing engine using online learning based on the identified artifacts, wherein comparing the synthetic conference transcripts and providing the additional training are recursively repeated to successively improve performance of the natural language processing engine at generating synthetic conference transcripts that include fewer artifacts; and
outputting a portion of the synthetic conference transcripts selected based on the identified artifacts.

9. The non-transitory computer readable medium of claim 8, the operations further comprising:
initially training the natural language processing engine to generate the synthetic conference transcripts using two-phase training, a first phase of the two-phase training leveraging natural language data, and a second phase of the two-phase training leveraging the conference data.

10. The non-transitory computer readable medium of claim 8, the operations further comprising:
training, using the portion of the synthetic conference transcripts, an artificial intelligence engine to generate labels for sections of conference transcripts.

11. The non-transitory computer readable medium of claim 8, the operations further comprising:
training, using the portion of the synthetic conference transcripts, an artificial intelligence engine to respond to a query based on at least one of a conference transcript or a conference recording.

12. The non-transitory computer readable medium of claim 8, wherein the conference data comprise transcripts or recordings of real-world conferences, wherein the transcripts of the real-world conferences or the recordings of the real-world conferences are available via a public network.

13. The non-transitory computer readable medium of claim 8, wherein the conference data is a subset of text or audio data used to initially train the natural language processing engine.

14. The non-transitory computer readable medium of claim 8, wherein the natural language processing engine comprises a generative pretrained transformer.

15. A system, comprising:
a memory subsystem; and
processing circuitry configured to execute instructions stored in the memory subsystem to:
generate, using a natural language processing engine, synthetic conference transcripts;
compare the synthetic conference transcripts with conference data to identify artifacts in the synthetic conference transcripts, wherein the artifacts comprise anomalies that distinguish the synthetic conference transcripts from the conference data and indicate that the synthetic conference transcripts are generated using artificial intelligence techniques and do not correspond to real-world conferences;

provide additional training to the natural language processing engine using online learning based on the identified artifacts, wherein comparing the synthetic conference transcripts and providing the additional training are recursively repeated to successively improve performance of the natural language processing engine at generating synthetic conference transcripts that include fewer artifacts; and output a portion of the synthetic conference transcripts selected based on the identified artifacts.

16. The system of claim 15, the processing circuitry further configured to execute the instructions stored in the memory subsystem to:

initially train the natural language processing engine to generate the synthetic conference transcripts using multi-phase training, at least one phase of the multi-phase training leveraging the conference data.

17. The system of claim 15, the processing circuitry further configured to execute the instructions stored in the memory subsystem to:

train, using the portion of the synthetic conference transcripts, an artificial intelligence engine to generate labels for sections of conference transcripts, each label being associated with a natural language tag.

18. The system of claim 15, the processing circuitry further configured to execute the instructions stored in the memory subsystem to:

train, using the portion of the synthetic conference transcripts, a machine learning engine to respond to a query based on one or more conference transcripts.

19. The system of claim 15, wherein the conference data comprise transcripts of real-world conferences that are available via a public network.

20. The system of claim 15, wherein the natural language processing engine comprises a large language model.

21. The method of claim 1, wherein the portion comprises synthetic conference transcripts having less than a threshold number of artifacts.

* * * * *